Patented Mar. 20, 1945

2,371,642

UNITED STATES PATENT OFFICE 2,371,642

PROCESS FOR REACTING NICKEL WITH ORGANIC SULPHONES

Ralph Mozingo, Elizabeth, N. J., assignor to Merck & Co., Inc., Rahway, N. J., a corporation of New Jersey No Drawing. Application July 16, 1943, Serial No. 495,072

10 Claims. (Cl. 260—668)

This invention relates in a general sense to processes for the synthesis of organic chemical compounds, and, more particularly, is concerned with a method for removing a sulphone group from certain organic compounds containing this group to produce corresponding hydrocarbons or substituted hydrocarbons according to the following, wherein R and R' are aliphatic or aromatic groups: $R.SO_2.R' \rightarrow RH + R'H$.

In accordance with the present invention, certain aromatic or aliphatic sulphones or the like, are treated with a pyrophoric nickel catalyst such as Raney nickel, whereby the compounds are molecularly cleaved, the sulphone group is removed from the residue of the molecule, and the corresponding hydrogenated compounds are produced. It is preferred to conduct the operations at an elevated temperature, for example, by refluxing the sulphur-containing substance alone or in the presence of a solvent, with the catalyst. However, if desired, the reaction can be performed at or slightly above ordinary room temperature provided additional time for reaction is allowed.

The pyrophoric nickel catalyst used in practicing the process according to the present invention can be prepared as described in U. S. Patents 1,563,587 of December 1, 1925; 1,628,190 of May 10, 1927, or 1,915,473 of June 27, 1933, or by any other similar procedure capable of yielding a body consisting predominantly of finely divided nickel with hydrogen, the latter being present as a metallic hydride, or merely adsorbed on the surface of the mass. When the catalyst is prepared as described in the above-mentioned patents, it is preferred to modify the procedure there described by carrying out the final heating of the intermediate nickel-aluminum alloy in an alkaline solution at a temperature of 50–80° C. for one hour instead of at the somewhat higher temperatures specified in the patents.

The following example illustrates a method of carrying out the present invention, but it is to be understood that this example is given by way of illustration and not of limitation.

Example

About 2 g. of diphenylsulphone $(C_6H_5.SO_2.C_6H_5)$ in approximately 100 cc. of ethanol and 35 cc. of water are refluxed about 6 hours with 25–30 g. of Raney nickel catalyst. After dilution with water, the mixture is distilled to obtain the product, benzene.

It will be apparent that the principles of this invention can be applied, with appropriate modifications that are within the expected skill of persons versed in this art, to symmetrical or asymmetrical aromatic or aliphatic sulphones. The appended claims embrace the process of the presence invention thus modified.

What is claimed is:

1. The process that comprises reacting a pyrophoric nickel catalyst and an organic compound containing a sulphone group.

2. The process that comprises reacting Raney nickel and an organic compound containing a sulphone group.

3. The process that comprises reacting at an elevated temperature a pyrophoric nickel catalyst and an organic compound containing a sulphone group.

4. The process that comprises reacting at an elevated temperature and in the presence of a solvent, a pyrophoric nickel catalyst and an organic compound containing a sulphone group.

5. The process that comprises refluxing together in the presence of a substantially inert solvent a pyrophoric nickel catalyst and an organic compound containing a sulphone group.

6. The process that comprises reacting at an elevated temperature Raney nickel and an organic compound containing a sulphone group.

7. The process that comprises reacting at an elevated temperature and in the presence of a solvent Raney nickel and an organic compound containing a sulphone group.

8. The process that comprises refluxing together in the presence of a substantially inert solvent Raney nickel and an organic compound containing a sulphone group.

9. The process that comprises treating an organic compound containing a sulphone group with a pyrophoric nickel catalyst to cause removal of the sulphone group and satisfaction of valence bonds, formerly linked to the sulphur atom, with hydrogen.

10. The process that comprises treating an organic compound containing a sulphone group with Raney nickel catalyst to cause removal of the sulphone group and satisfaction of valence bonds, formerly linked to the sulphur atom, with hydrogen.

RALPH MOZINGO.